United States Patent Office 3,350,367
Patented Oct. 31, 1967

3,350,367
PROCESS FOR PRODUCTION OF
THIOACETAL POLYMERS
Ryoichi Wakasa, Shinichi Ishida, and Hiroshi Ohama, Tokyo, Japan, assignors to Asahi Kasei Kogyo Kabushiki Kaisha, Osaka, Japan, a corporation of Japan
No Drawing. Filed July 8, 1964, Ser. No. 381,209
Claims priority, application Japan, July 8, 1963, 38/35,145; Sept. 13, 1963, 38/48,156
12 Claims. (Cl. 260—79)

This invention relates to a novel process for producing thioacetal polymers, more particularly polymethylene sulfide.

Polymethylene sulfide has been heretofore produced by allowing a 37% aqueous formaldehyde solution to react with alkali metal sulfide or polysulfide [J. F. Walker: "Formaldehyde," 2nd edition, page 190 (1953)], or by carrying out condensation of methane dithiol ($HSCH_2SH$) or mercaptomethyl sulfide ($HSCH_2SCH_2SH$) at a temperature of 35° to 250° C. in the presence of a basic catalyst, or further by carrying out ring cleavage polymerization of trithiane in a fused state in the presence of a cationic catalyst without solvent.

The present invention is characterized by carrying out ring cleavage polymerization of a cyclic thioacetal, particularly trithiane, the cyclic trimer of thioformaldehyde which is unstable in a form of monomer. The reaction is carried out in the presence of one or more compounds represented by the formulae

wherein

X is —OH, —SH, —$OR_2$, —$SR_2$

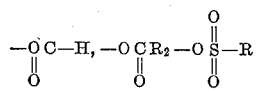

or halogens, $R_1$ and $R_2$ being alkyl group, cycloalkyl group, aryl group, aralkyl group, or alkenyl group, or alkyl group, cycloalkyl group, aryl group, aralkyl group, or alkenyl group having functional groups comprising one or a combination of hydrogen, halogen, nitrogen, oxygen, and sulfur atom, further including such cyclic compound where $R_1$ and X are combined with each other; and (B), one or more metal hydrosulfates, metal pyrosulfates and metal alkyl- or aralkylsulfates.

It has been heretofore well known that esters of sulfonic acid, sodium alkylsulfate, and the like are used as an alkylation agent for hydroxyl group, but it has not been known that if used with cyclic thioacetal, particularly trithiane, it readily accelerates the cleavage of carbon-sulfur bonds to produce thioacetal polymer, particularly polymethylene sulfide. The present inventors have discovered these phenomena for the first time.

Thioacetal polymer, particularly polymethylene sulfide obtained according to the present invention is in a white powdery or block state, has a softening point of 220° to 265° C. and a remarkable thermal stability, and can be molded into foil or filament by the melting mold process. Further, the said polymethylene sulfide can be confirmed by infrared absorption spectroscopy whereby the 910 cm.$^{-1}$ bond of trithiane monomer is shifted to 850 cm.$^{-1}$, and 730 cm.$^{-1}$ becomes two characteristic absorption bond of 720 cm.$^{-1}$ and 750 cm.$^{-1}$. Furthermore, it has such characteristics as X-ray diffraction appears strong at 4.42 A. and 3.01 A. of interfacial distance and medium strong at 2.17 A. in the X-ray diffraction measurement, which are characteristic of highly crystalline structure.

The polymerization catalysts employed in the present invention are enumerated for group (A) as follows: alkyl, aryl, or aralkyl sulfonic acids, anhydrides thereof, alcohols and esters thereof, anhydride thereof with organic carboxylic acid, halides of alkyl, aryl, or aralkyl sulfonic acid, alkyl, aryl, or aralkyl thiosulfonic acids and ester thereof, more specifically, such compounds as benzene sulfonic acid, toluene sulfonic acid, ethane sulfonic acid, vinyl sulfonic acid, benzene sulfonic anhydride, 1-naphthalene sulfonic anhydride, methyl ester of benzene sulfonic acid, ethyl ester of metanitrobenzene sulfonic acid, benzyl ester of parachlorobenzene sulfonic acid, ethyl ester of ethyl sulfonic acid, orthosulfobenzoic anhydride, chloride of benzene sulfonic acid, fluoride of toluene sulfonic acid, benzene thiosulfonic acid, ethyl ester of toluene thiosulfonic acid.

For group (B), as the metal hydrosulfates are enumerated such hydrosulfates or double salts of metals of Group Ia in the Periodic Table as ammonium hydrosulfate, lithium hydrosulfate, sodium hydrosulfate, potassium sulfate, and potassium sulfate tripotassium hydrosulfate, such salts of metals of Group IIa in the Periodic Table as magnesium hydrosulfate, and such salts of metals of Group IIIa in the Periodic Table as aluminum hexahydrosulfate. As the metal salts of pyrosulfuric acid are enumerated such salt with pyrosulfuric acid of metals of Group I in the Periodic Table as ammonium pyrosulfate, lithium pyrosulfate, sodium pyrosulfate, potassium pyrosulfate, silver pyrosulfate, and copper pyrosulfate, such salt of metals of Group IIa in the Periodic Table as magnesium pyrosulfate, calcium pyrosulfate, and barium pyrosulfate, such salt of metals of Group IIb in the Periodic Table as zinc pyrosulfate, such salt of metals of Group IVa in the Periodic Table as lead pyrosulfate, and other compounds such as iron pyrosulfate, uranium pyrosulfate and the like. As the metal salt of alkyl or aralkylsulfuric acid are enumerated such salts of Group I in the Periodic Table as ammonium salt, lithium salt, sodium salt, copper salt and silver salt of methyl-, ethyl-, n-propyl, n-octyl- and benzylsulfuric acid, such salts of Group II in the Periodic Table as magnesium salt, calcium salt, strontium salt, barium salt, zinc salt, and cadmium salt, such salts of Group IIIa in the Periodic Table as aluminum salt, such salts of Group Va in the Periodic Table as bismuth salt and antimony salt, and other salts of iron, cobalt, nickel and the like.

The activity of these polymerization catalysts is, of course, different and varies depending upon changes of substitution groups even in the same group, or changes of metallic ion in case of salts. If optimum conditions are selected in view of the compound employed, cyclic thioacetal, particularly trithiane can be readily converted into thioacetal polymer, particularly polymethylene sulfide.

In carrying out the present invention, the said polymerization catalyst is added to trithiane in the polymerization reactor in a range of 0.0001 to 10 percent by weight, preferably 0.001 to 0.1% by weight.

The polymerization catalyst may be added in a definite amount in a solid state as such into the polymerization reactor with vigorous stirring, but if it is desired that the distribution thereof may be uniformly effected into trithiane, the polymerization catalyst may be dispersed into such solvents as benzene, toluene, ethyl ether or tetrahydrofuran to make a 0.001 to 10% (by weight) solution or suspension, and the resulting solution or suspension may be distributed into the polymerization reactor in a range of the said amount to be added.

Trithiane used in the present invention may be those purified by repetitive recrystallization by means of benzene or toluene, or those purified by the sublimation process, but it is preferable to remove sulfur, moisture, or the like in trithiane in advance, because these contaminants not only cause a lowering of the polymerization rate and yield, but also a lowering of the softening point of the formed polymethylene sulfide.

In carrying out the present invention, the polymerization temperature is in a range from normal temperature to 250° C., preferably 100° to 230° C. Though the melting point of trithiane is 216° C., the polymerization can be carried out in the stated temperature range in a solid phase under the melting point, or in the molten state above the melting point, or further in the completely or partially dissolved state of trithiane in a hydrocarbon solvent such as diphenyl. Further, the polymerization can be carried out in the said above temperature range in the suspended state of trithiane crystals or of molten trithiane in the presence of aliphatic hydrocarbon non-solvent such as solid paraffin. In this case, the amount of organic solvent or non-solvent is practically in a range of 10 to 500% by weight of that of trithiane. The polymerization period must be determined in view of the kind of catalyst, its amount and the polymerization temperature, to produce polymethylene sulfide in the best yield, but lies in a range from a few minutes to 24 hours, and up to 4 hours are substantially sufficient under the optimum reaction condition. It is preferred that during polymerization, the reactants be isolated from oxygen and air, by polymerizing in an inert gas such as nitrogen to prevent the oxidation of trithiane. Polymethylene sulfide can be recovered by grinding the powdery or lumpy polymer obtained, and carrying out thermal extraction of substances soluble in chlorobenzene, ortho- or metadichlorobenzene, anisole, ethylbenzene, toluene or the like for separation thereof.

By this treatment, polymethylene sulfide can be obtained substantially as an odorless, white powder. The resulting substance is insoluble in ordinary organic solvent, but dissolves in quinoline and tetrachlorodiphenyl and precipitates again by cooling.

The polythioacetal thus obtained does not decompose above the melting point thereof, and can be more easily heated and processed into film, sheet, rod, and other moldings by the pressure molding than conventional polyoxymethylene. Its softening point is extremely higher than that of polyoxymethylene, and products having rigid and excellent properties can be manufactured. Modes in practice of the present invention are hereunder illustrated with reference to examples, but the scope of the present invention must not be restricted thereto.

*Example I*

Into a glass ampoule were placed 5 parts by weight of trithiane (melting point 216° C.) obtained by purification according to the sublimation method, 5 parts of diphenyl, and 0.5 part of ethyletheral sublimation method, 5 parts of diphenyl, solution of methyl ester of paratoluene sulfonic acid at 13.5 g./100 cc., and degasifying and evaporation of ether were carried out under $10^{-5}$ mm. Hg, followed by introduction of dry nitrogen. Thereafter, deaeration was carried out again under $10^{-5}$ mm. Hg and then the ampoule was sealed by fusing. Polymerization was carried out by heating at 200° C. for 4 hours. After the polymerization, unreacted trithiane, and byproducts further diphenyl were removed from the polymer by extraction in a Soxhlet extractor where monochlorobenzene was used as the extraction agent. Then, vacuum drying was carried out at 40° C. overnight and 2.3 parts of white polymethylene sulfide were obtained. The softening temperature of the product was 150° C. Its viscosity was 0.08 at 230° C. and 1 g./100 cc. concentration where tetrachlorodiphenyl was used as the solvent. In the above method, in the absence of methyl ester of paratoluene sulfonic acid, no material insoluble in monochlorobenzene was recovered.

*Example II*

Into a glass ampoule of 30 cc. capacity were placed 5 parts of trithiane obtained by purification based on recrystallization from benzene and 0.072 part of an ethereal solution of toluene sulfonic acid (2.8 g./1 l.). Evaporation of ether and degasifying were carried out under $10^{-5}$ mm. Hg, and then dry nitrogen was introduced thereinto, followed by under $10^{-5}$ mm. Hg. Thereafter, the glass ampoule was sealed and heated to 230° C. After an hour, the resultant polymer was ground, and unreacted trithiane and byproduct were removed by extraction in a Soxhlet extractor where monochlorobenzene was used as the extraction agent. Then, vacuum drying was carried out at 40° C. overnight and 4.0 parts of white polymethylene sulfide were obtained. The softening temperature was 248° C.

*Example III*

Into a glass ampoule were placed 0.5 part of an ethereal solution of methyl ester of paratoluene sulfonic acid 1.35 g./100 cc.), ether was completely removed by vacuum drying, and purified by the sublimation method. Then, 5 parts of trithiane were added to the ampoule, and after flushing with nitrogen, degasifying was carried out under $10^{-5}$ mm. Hg, followed by sealing of one ampoule. Solid-phase polymerization was carried out at 200° C. for 4 hours. After polymerization, theh product was treated in a manner similar to Example I, and 3.7 parts of polymethylene sulfide were obtained. Its softening temperature was 260° C.

*Example IV*

Into a glass ampoule were placed 5 parts of trithiane purified from benzene by recrystallization, 2 parts of solid paraffin, and 1 part of an ethereal solution of benzene sulfonic acid anhydride of 1.075 g./100 cc., and degasifying was carried out under $10^{-5}$ mm. Hg. Then, dry nitrogen was introduced to the ampoule and degasifying was carried out again under $10^{-5}$ mm. Hg. Thereafter, the ampoule was sealed and heated to 200° C. After 4 hours the polymer was taken out of the ampoule and treated in the manner indicated in Example I, whereby 3.5 parts of white polymethylene sulfide were obtained. Its softening temperature was 250° C.

*Example V*

Into a glass ampoule were placed 5 parts of trithiane purified by the sublimation method, 1 part of ethylethereal solution of orthosulfo benzoic anhydride (0.333 g./100 cc.) and 2.0 parts of diphenyl, and the polymerization was carried out in the manner of Example I, whereby 4.2 parts of polymethylene sulfide were recovered. Its softening temperature was 255° C.

*Example VI*

Into a glass ampoule were placed 5 parts of trithiane purified by the benzene extraction method, 2.5 parts of diphenyl, and 0.013 part of sodium lauryl sulfate, and the polymerization was carried out in the manner of Example I. By the treatment of Example I, 2.8 parts of white polymethylene sulfide were obtained. Its softening temperature was 235° C.

*Example VII*

Into a glass ampoule were placed 5 parts of trithiane obtained from benzene by purification based on recrystallization, 2.5 parts of diphenyl, and 0.009 part of sodium pyrosulfate, and degasifying was carried out under $10^{-5}$ mm. Hg., followed by introduction of dry nitrogen and degasifying repeated under $10^{-5}$ mm. Hg.

Then, the glass ampoule was sealed and heated at 200° C. for 8 hours. After polymerization, the polymer was placed in a Soxhlet extractor using monochlorobenzene as the extraction agent to remove unreacted trithiane, byproducts and diphenyl by extraction. Vacuum drying was carried out overnight at 40° C., and 1.4 parts of white polymethylene sulfide were obtained. Its softening temperature was 236° C.

*Example VIII*

Using the method of Example VI, substituting 2.5 parts of solid paraffin for the diphenyl employed in Example VI, 2.5 parts of white polymethylene sulfide were obtained. Its softening temperature was 245 to 250° C., and thin white sheets were obtained by carrying out pressure molding thereof at 250° C. for 3 minutes at a pressure of 80 kg./cm.²

*Example IX*

Using the method of Example VII, substituting 0.0051 part of potassium hydrosulfate for the sodium pyrosulfate of Example VII, 1.3 parts of polymethylene sulfide were obtained.

What we claim is:
1. A process for producing a polythioacetal, said process comprising polymerizing trithiane up to 250° C. in the presence of 0.0001–10% by weight of at least one polymerization catalyst of the formula:

wherein
X is selected from the group consisting of

—OH, —SH, —OR$_2$, —SR$_2$,

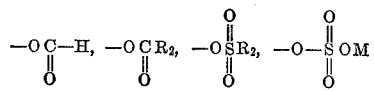

and halogens;

R$_1$ is selected from the group consisting of alkyl, cycloalkyl, aryl, aralkyl, alkenyl and —OM groups;
R$_2$ is selected from the group consisting of alkyl, cycloalkyl, aryl, aralkyl, and alkenyl groups; and
M is selected from the group consisting of ammonium ion and metal ions of Groups Ia, IIa, IIb, IIIa, IVa and Va of the Periodic Table.

2. The process as claimed in claim 1, wherein 0.001–0.1% by weight of the catalyst is present.
3. The process as claimed in claim 1, wherein polymerizing is effected in an oxygen free atmosphere.
4. The process as claimed in claim 1, wherein polymerizing is effected in a polymerization medium.
5. The method as claimed in claim 4, wherein the polymerization medium is diphenyl.
6. The method as claimed in claim 4, wherein the polymerization medium is solid paraffin.
7. The method as claimed in claim 1, wherein the polymerization catalyst is toluene sulfonic acid.
8. The method as claimed in claim 1, wherein the polymerization catalyst is the methyl ester of paratoluene sulfonic acid.
9. The method as claimed in claim 1, wherein the polymerization catalyst is benzene sulfonic anhydride.
10. The method as claimed in claim 1, wherein the polymerization catalyst is orthosulfobenzoic anhydride.
11. The method as claimed in claim 1, wherein the polymerization catalyst is sodium lauryl sulfate.
12. The method as claimed in claim 1, wherein the polymerization catalyst is disodium pyrosulfate.

References Cited
UNITED STATES PATENTS 3,070,580  12/1962  Harmon _____ 260—79
3,218,300  11/1965  Kullman et al. _____ 260—79

OTHER REFERENCES

24 Chemical Abstracts 4506 (1930), Husson: Oxidation of (CH$_2$S)$_3$ with KMnO$_4$ in an acid medium, leading to formation of trisulfone and issufone.

60 Chemical Abstracts 1461c (1964), Lando et al.: Solid-state polymerization of trithiane—the trithiane was sealed in a borosilicate glass tube and exposed to 60 Co dose of 9.8 megarads at 195° C. for 18½ hours.

DONALD E. CZAJA, *Primary Examiner.*

LEON J. BERCOVITZ, *Examiner.*

M. I. MARQUIS, *Assistant Examiner.*